June 25, 1957 J. C. KOCI 2,796,812
PHOTOGRAPHING APPARATUS
Filed May 22, 1956 5 Sheets-Sheet 1

INVENTOR.
JERRY C. KOCI
BY Clarence E. Prudy
HIS ATTORNEY.

June 25, 1957  J. C. KOCI  2,796,812
PHOTOGRAPHING APPARATUS

Filed May 22, 1956  5 Sheets-Sheet 2

INVENTOR.
JERRY C. KOCI
BY
Clarence E. Threlkeld
HIS ATTORNEY.

June 25, 1957 J. C. KOCI 2,796,812
PHOTOGRAPHING APPARATUS
Filed May 22, 1956 5 Sheets-Sheet 3

INVENTOR.
JERRY C. KOCI
BY
HIS ATTORNEY.

June 25, 1957
J. C. KOCI
2,796,812
PHOTOGRAPHING APPARATUS
Filed May 22, 1956
5 Sheets-Sheet 4
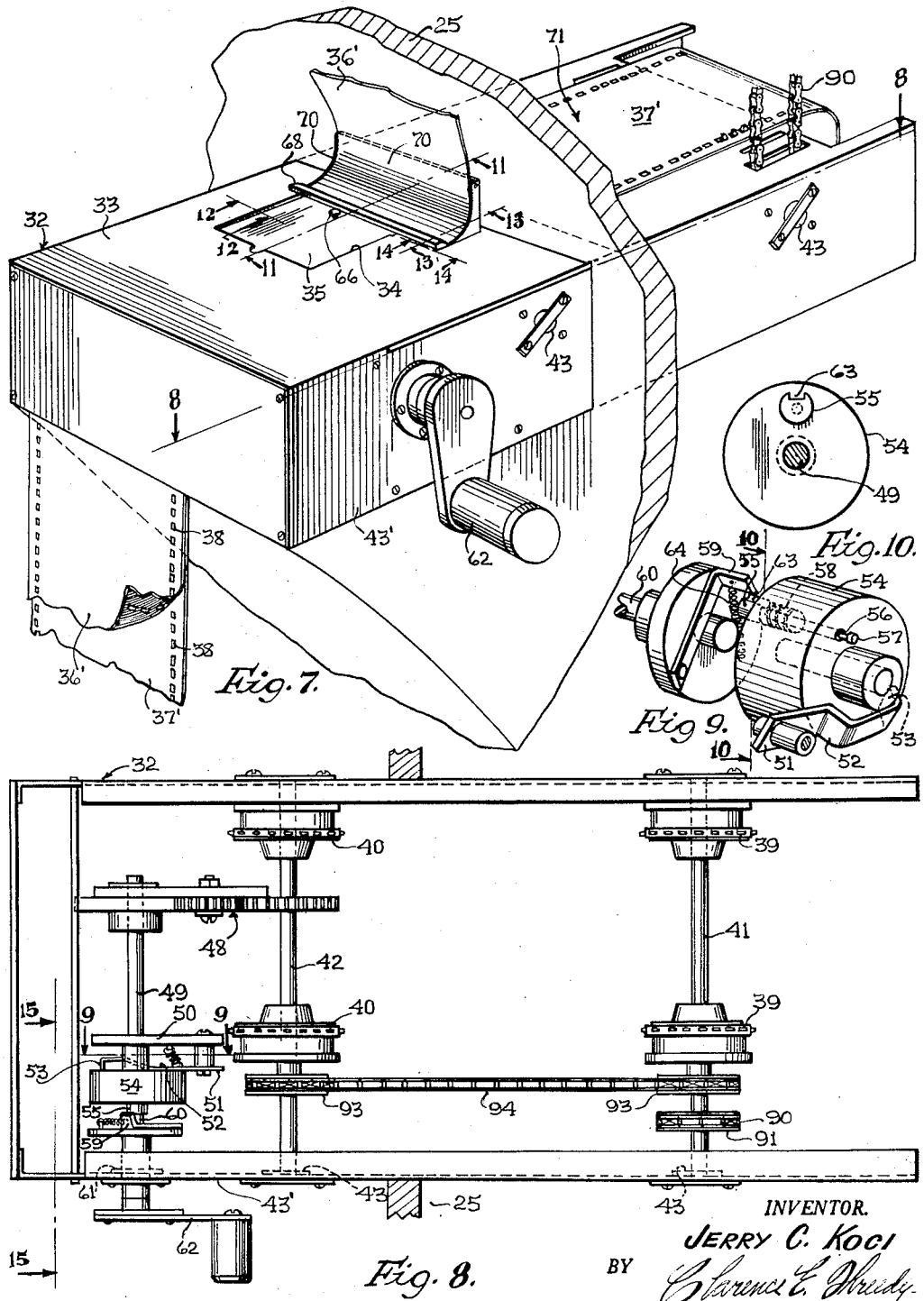
INVENTOR.
JERRY C. KOCI
BY Clarence E. Thredy
HIS ATTORNEY.

June 25, 1957  J. C. KOCI  2,796,812
PHOTOGRAPHING APPARATUS
Filed May 22, 1956  5 Sheets-Sheet 5

INVENTOR.
JERRY C. KOCI
BY Clarence E. Ohredy
HIS ATTORNEY.

2,796,812
Patented June 25, 1957

2,796,812
PHOTOGRAPHING APPARATUS

Jerry C. Koci, Barrington, Ill., assignor to Chicago Coin Machine Co., Chicago, Ill., a corporation of Illinois Application May 22, 1956, Serial No. 586,445

6 Claims. (Cl. 95—1.1)

My invention relates to improvements in a photographing apparatus.

Summarily, it is the object of this invention to provide in a photographing apparatus of the character hereinafter described, an arrangement for taking the picture of an individual on a roll of film, in black and white or in color, while at the same time and on the same film immediately adjacent to the individual's picture, a picture is taken of a section of a two-layer paper web, on which is written by the individual, in duplicate, subject matter such for example, the name and address identifying the individual whose picture has been taken. The original of such identification is retained by the individual for subsequent claiming of the picture. The carbon copy of such identification is moved to a position where it is photographed simultaneously with the photographing of the individual.

After a predetermined number of photographs have been taken together with their respective identifications, the undeveloped film roll is removed from the apparatus and delivered to a photographic laboratory where the film is developed by skilled technicians and prints made thereof. After such development and making of prints, the pictures are either mailed to the individuals or held by the laboratory pending calling for the pictures by such individuals.

Another object of this invention is to provide a photographing apparatus which may be used by the public for the taking of portraits which are to be developed by a skilled photographic laboratory technician.

Yet another object of the invention is to provide in a photographing apparatus an arrangement for simultaneously taking the picture of an individual on a roll of film and an identification of such picture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 7 is a fragmentary perspective view of the writing platform embodied in the invention;

Fig. 8 is a fragmentary sectional detail view taken substantially on line 8—8 of Fig. 7;

Fig. 9 is a fragmentary perspective view taken substantially on line 9—9 of Fig. 8;

Fig. 10 is a fragmentary sectional detail view taken substantially on line 10—10 of Fig. 9;

Figures 1, 18:
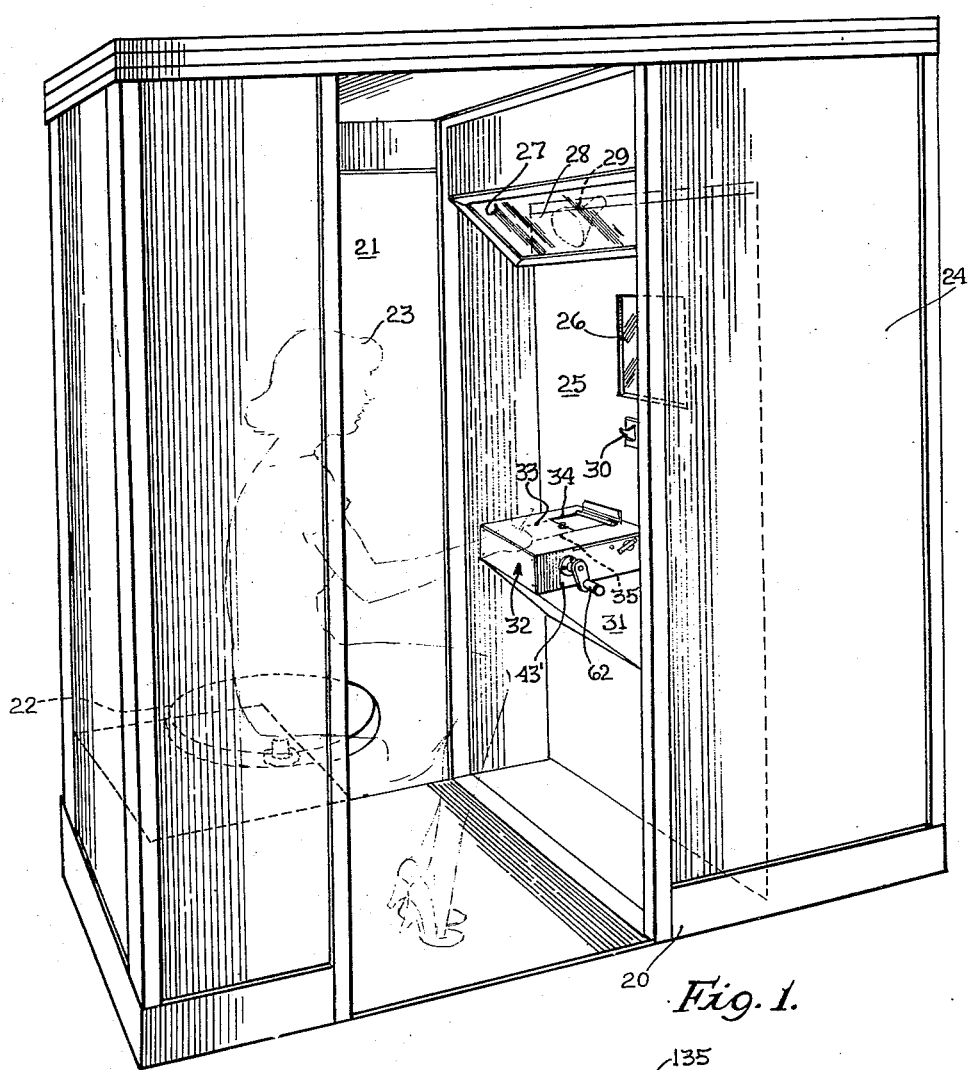
Fig. 1 is a perspective view of a photographing apparatus embodying my invention.
Fig. 18 is a schematic diagram of a wiring circuit which may be employed in the invention.
Figure 2:
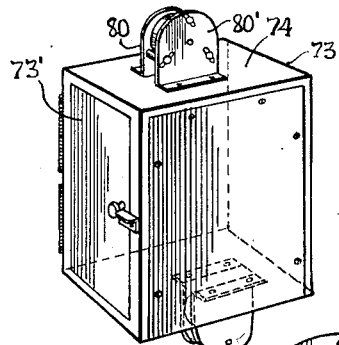
Fig. 2 is a perspective view of the film and camera housing embodied in my invention.

My improved photographic apparatus comprises a cabinet 20 constructed and arranged to provide a booth 21 having a suitable seat 22 upon which the individual 23 whose picture is to be taken may sit (Fig. 1). The cabinet 20 further provides a housing 24, one wall of which may be removable to permit access thereto, and within which cabinet the photographing mechanism of my invention is confined.

A wall 25 of the cabinet 20 facing the individual 23 and constituting one of the walls of the booth 21 is provided with a window 26 preferably closed with suitable transparent material which, while not interfering with the photographing of the subject, will prevent unauthorized access to the interior of the housing 24.

Above the window 26 is an opening 27 likewise closed by suitable transparent material 28 inclined so as to direct light rays from a photographic light bulb 29 around and over the proper area in which the individual 23 is positioned for the taking of the photograph.

On this wall 25 is a coin slot 30 which controls a suitable switch hereinafter more specifically referred to.

Figure 11:
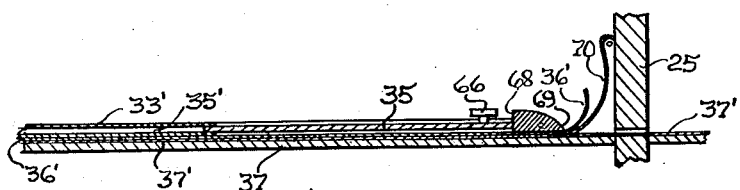
Fig. 11 is a fragmentary sectional detail view taken substantially on line 11—11 of Fig. 7.

A box-like structure 32 provides a writing table 33. This writing table 33 is connected to the wall 25 of the housing 24 and is supported laterally therefrom by a supporting structure 31. In the top wall 33' of the table is an opening 34 normally closed by a slidable door 35, the opposite side edge portions of which are slidably positioned in confronting grooves 35' (Fig. 11) formed in the top wall 33'.

A web of paper from a suitable roll or the like is adapted to pass beneath this opening 34 with a section thereof exposed through the opening 34 when the door 35 is in open position. On this exposed portion of the paper web 36, the individual may write his or her name and address together with the date that the photograph is taken.

The paper to be written upon is delivered to the opening 34 from a suitable roll in a manner now to be described.

As seen in Figs. 11 to 14 inclusive, the paper web 36 moves between the top wall 33' of the writing table 33 and a wall 37 disposed directly beneath the writing table 33 and serving to support the exposed web section when written upon. The paper web 36 comprises two intimate layers of paper 36' and 37'. The outer layer 36' has its surface which contacts the inner layer 37' surfaced with a carbon material so that writing upon the outer layer will be transmitted to or impressed upon the inner layer 37'.

The paper web has its longitudinal edges perforated as at 38 (Fig. 7). These perforations engage sprockets 39 and 40 (Fig. 8). Such sprockets 39 and 40 are mounted on shafts 41 and 42 respectively for rotation therewith. These shafts are journalled in suitable bearings 43 provided by the opposite side walls 43' of the box-like structure 32.

The shaft 42 by a train of gears 48 is connected with a shaft 49. Such shaft 49 has extending therefrom an arm 50 (Figs. 8, 15–17). At the outer end of the arm 50 is pivotally connected an end portion 51 of a release bar 52 bent to provide a cam 53 at its free end portion.

Rotatable with the shaft 49 is a disc 54. This disc 54 carries a spring-urged plunger 55. One end of such plunger is grooved as at 56 to provide a head 57 which is adapted to be engaged by the release arm 52 and ride upon the cam 53 to draw the plunger into its socket 58 out of the path of an arm 59 carried by a shaft 60. This shaft 60 is journalled in a suitable bearing 61 provided by the adjacent side wall 37 of the box-like structure 32.

Figure 16:
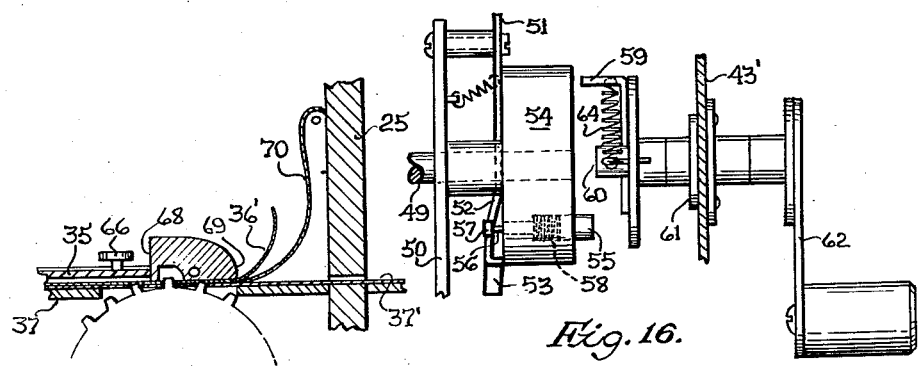
Fig. 16 is a fragmentary sectional detail view similar to that shown in Fig. 15 but showing the parts thereof in an advanced stage of operation.
Figure 13:
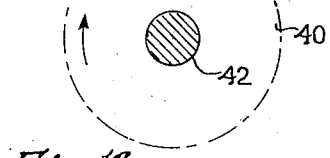
Fig. 13 is a fragmentary sectional detail view taken substantially on line 13—13 of Fig. 7.
Figure 14:
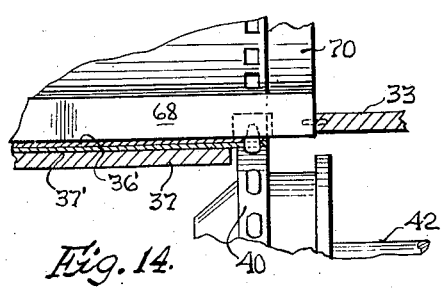
Fig. 14 is a fragmentary sectional detail view taken substantially on line 14—14 of Fig. 7.
Figure 17:
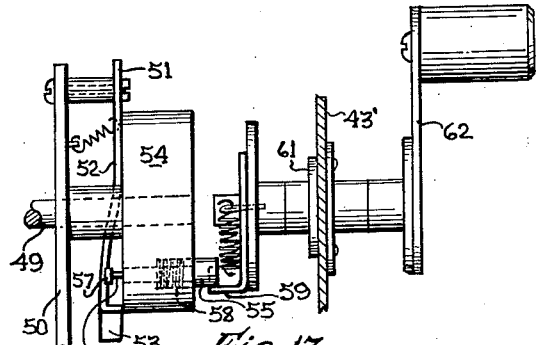
Fig. 17 is a fragmentary sectional detail view similar to Figs. 15 and 16 but showing the parts thereof in a further advanced stage of operation.

The opposite end of the shaft 60 carries a crank 62 by which the shaft 60 is rotated. If the plunger 55 is in projected position as shown in Fig. 16, manual rotation of the shaft 60 by manipulation of the crank 62 will rotate the arm 59 into engagement with the plunger 55, whereby to momentarily couple the shaft 49 with the shaft 60 for rotation of the latter when the crank 62 is manipulated.

When the head 57 engages and rides upon the cam 53, the plunger 55 at a predetermined time in the cycle of rotation of the disc 54 will be drawn from the path of the arm 59. This will result in disengaging the arm 59 from the plunger 55. When such takes place, the continued rotation of the shaft 60 by the crank 62 will not impart rotation to the shaft 49.

When the shaft 49 is rotated by rotation of the shaft 60, the shafts 41 and 42 will be rotated a sufficient distance to move beneath the opening 34 a portion of the paper web which is to be written upon when exposed through the opening 34 in the manner hereinafter set forth.

In Figs. 9 and 10 it will be noted that to provide connection between the plunger 55 and the arm 59, the plunger 55 is provided with a longitudinal groove 63 for the reception of the arm 59, which arm 59 is spring-urged into engagement with the groove by a spring 64.

Normally the opening 34 is closed by the door 35. To facilitate moving of this door 35, a finger button 66 is provided. The door 35 is normally releasably latched in closed position with respect to the opening 34 in a manner hereinafter set forth.

Figure 15:
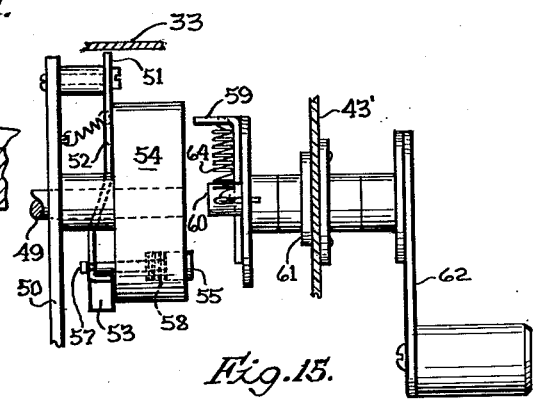
Fig. 15 is a fragmentary sectional detail view taken substantially on line 15—15 of Fig. 8.

The door 35, when in closed position, will engage the end 51 of the arm 59 and hold the latter with its free end engaging the groove 56 of the plunger 55, with the result that such plunger is held in its retracted position in its socket 58 (Fig. 15). By this arrangement, the paper web cannot be moved by the rotation of the crank 62 until the door 35 is in open position. Extending across the forward end 67 of the opening 34 is a fixed bar 68.

The edge portion 69 of the guide bar 68 is disposed over an edge portion of a curved separating plate 70. When the paper web is moved beneath the opening 34, the web is arranged with the edge of the guide plate 70 disposed between the layers thereof. By this arrangement when the paper web is moved from beneath the opening 34, the outer layer of the web will be separated from the inner layer by the plate 70.

By this arrangement, the outer layer will follow the contour of the guide plate 70 while the inner layer will continue its horizontal movement to a position indicated at 71, which position is within the range field of a mirror 72 hereafter more specifically referred to. From this position 71, the inner layer of the paper web is moved by sprocket gears 39 for winding upon a roller or the like until such time as such roller is removed for the purposes hereinafter described.

Simultaneously with the movement of the outer layer of the paper web from beneath the opening 34 to the area 71, a film strip is moved to a position in the camera, in the field of the lens thereof. This is accomplished in the following manner.

Arranged within the cabinet 20 is a housing 73 having a door 73' to permit access to the interior thereof. The top and bottom walls 74 and 75 of this housing are provided with slots 76 through which the film 77 passes. The film 77 is wound upon a film reel 78 removably mounted on a shaft 79 extending from one of the side walls of the film reel box 80, which box has a removable wall 80' to permit access to the interior of the box to mount and remove the reel from the shaft 79.

Figure 5:
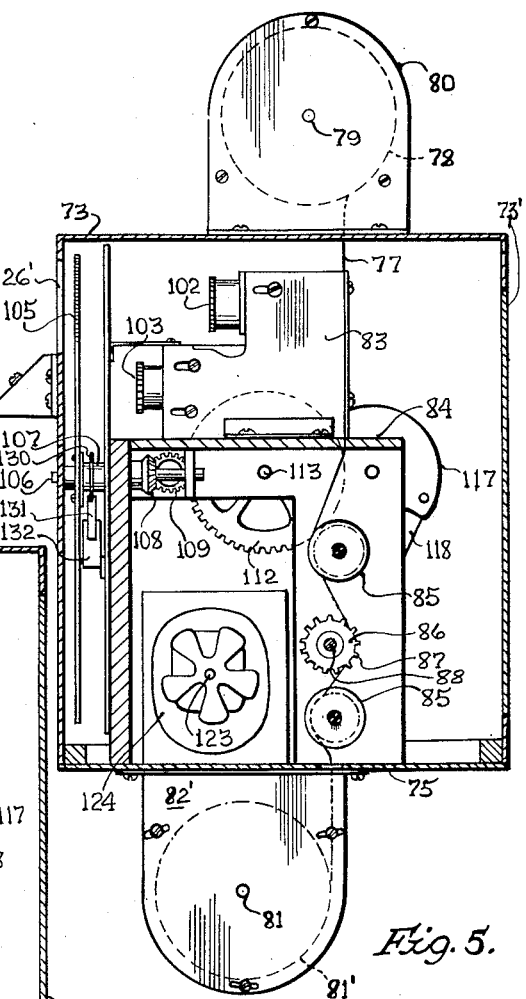
Fig. 5 is a fragmentary sectional detail view taken through the housing illustrated in Fig. 2.

A take-up reel 81' is mounted upon a shaft 81 journalled in a take-up box 82. On this reel the undeveloped film is wound. The box 82 like the box 80 has a removable wall 82' to permit access to the take-up reel 81'. The film is passed through the camera 83 mounted upon a supporting platform 84 within the housing 73 (Fig. 5). The film passes over guide rollers 85 between which is arranged a sprocket 86, the teeth 87 of which engage the perforations of the film (Fig. 5). This sprocket 86 is mounted on a shaft 88. On this shaft 88 is mounted a sprocket 89 having chain connection through the medium of a sprocket chain 90, with a sprocket 91 mounted on the shaft 41. This shaft 41 and the shaft 42 are drivingly connected together by sprocket gears 93 and a sprocket chain 94 (Fig. 8).

Figure 4:
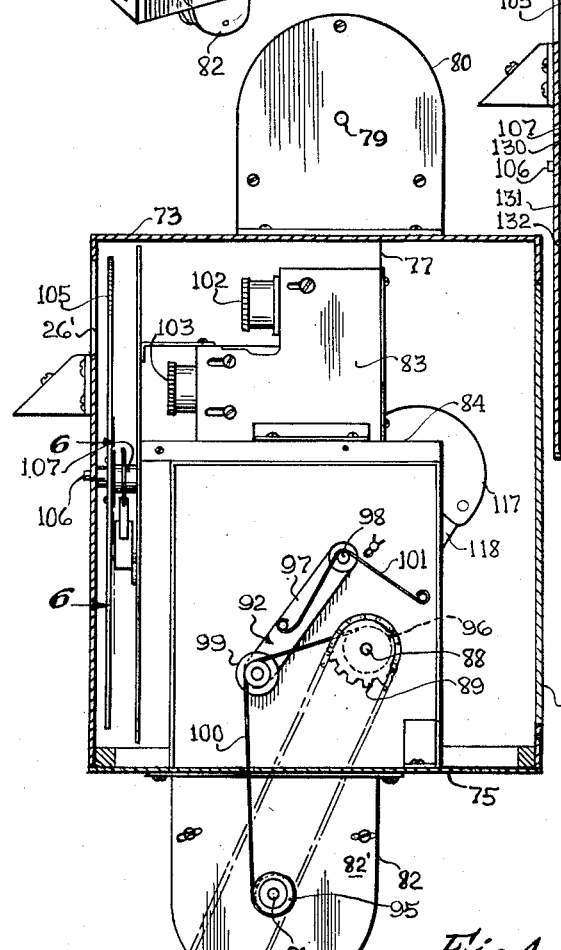
Fig. 4 is a sectional detail view of the reverse side of the apparatus as shown in Fig. 3.
Figure 6:
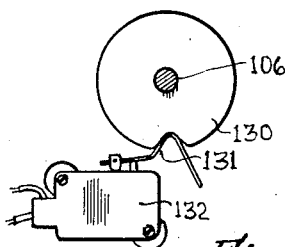
Fig. 6 is a fragmentary sectional detail view taken substantially on line 6—6 of Fig. 4.
Figure 3:
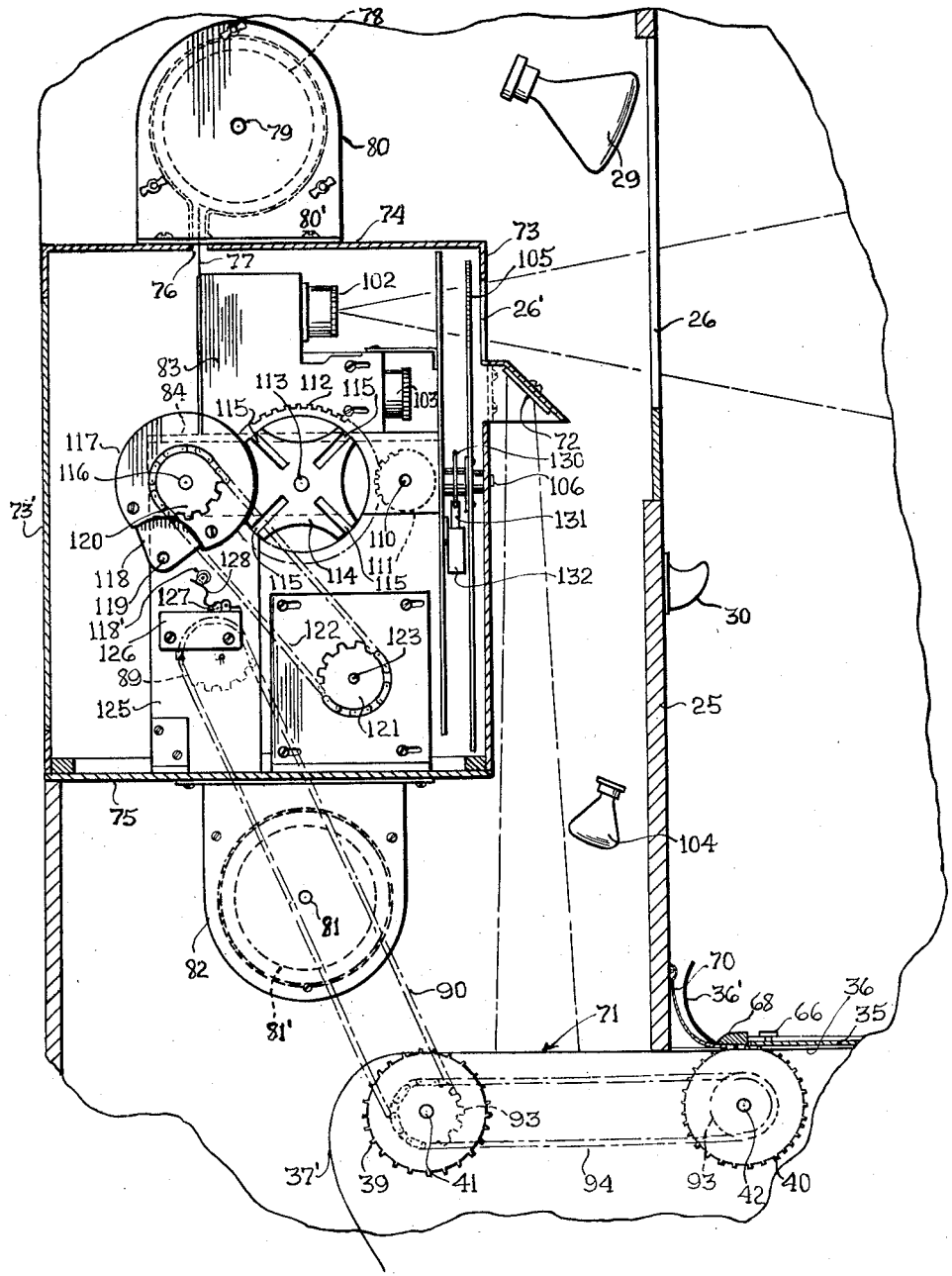
Fig. 3 is a fragmentary vertical sectional detail view of the apparatus taken through the housing illustrated in Fig. 2.

The shaft 81 on which the take-up reel is mounted carries a pulley 95. On the shaft 88 is a similar pulley 96. The tensioning device is indicated at 92 (Fig. 4). This tensioning device comprises an arm 97 pivotally mounted as at 98. On the free end of the arm 97 is a roller 99. Passing over this roller 99 and around the pulleys 95 and 96 is a belt 100. The arm 97 is pivoted in a direction to tension the belt 100 by means of a spring 101 (Fig. 4).

The arrangement is such that when the crank 62 is manually rotated to move a section of the paper web beneath the opening 34 through the spring connections with the shaft 88, the film will be moved a predetermined distance to present in the lens area, a section of the film on which the individual's picture is to be photographed.

The camera consists of two lenses 102 and 103. The lens 102 is aligned with the opening 26 through an opening 26' provided in the housing 73. The lens 103 is aligned with the mirror 72, into which is reflected the identification writing on the web section of the paper within the area 71. A suitable lamp 104 directs light down upon the area 71 sufficient for photograph taking.

The mirror 72 may be adjusted to accomplish an accurate reflection of the identification area of the web of paper within the area 71.

The camera further includes a shutter 105 mounted upon a shaft 106 journalled in a suitable bearing 107. This shutter 105 is of the conventional type and is operated through the medium of a worm gear 108 mounted on the shaft 106 and meshing with a worm gear 109.

The worm gear 109 is mounted on a shaft 110, on which shaft is mounted a gear 111 meshing with a gear 112. The ratio of the gear 111 to the gear 112 is such that the gear 111 will make one complete revolution with each one-quarter revolution of the gear 112. The gear 112 is mounted on a shaft 113 on which is mounted a Geneva gear 114 having radially extending slots 115. On a shaft 116 is mounted a disc 117. This disc 117 has an extension 118 carrying a lateral pin 119 which is adapted to pass into the slots 115 to rotate the gear 114 one-quarter revolution, the rotation of which in turn rotates the gear 112 one-quarter revolution.

On the shaft 116 is a gear 120 connected to a driving gear 121 by a sprocket chain 122. The gear 121 is mounted on a shaft 123 of a motor 124. This motor is incorporated in an electric circuit shown in Fig. 18 and more fully hereinafter described.

On a mounting plate 125 within the housing 73 is a normally closed switch 126 having a plunger 127 adapted to be depressed by an arm 128 in turn pivoted about its pivot point 129 by engagement with extension 118 through a roller 118'. This switch 126, as will be made apparent hereinafter, controls the circuit to the motor 124 so that upon each complete revolution of the disc 117 starting from the position shown, the motor will be deenergized.

Associated with the shutter shaft 106 is a cam 130 which is adapted to engage a plunger 131 of a switch 132. The switch 132 is arranged in the electric circuit controlling the lights 29 and 104. It is intended that this switch be of the rheostat type so that the brilliancy of the lamps 29 and 104 is increased as the shutter begins to rotate, so that at the proper time, the maximum light will be directed upon the individual and upon the identification part of the paper web. This accomplishes a more perfect photograph of both the subject and the identification section of the paper web.

In Fig. 18 I have illustrated a suggested circuit for controlling the motor and the opening and closing of the closure plate 35. In this connection a power source is indicated at 133. One side of a coin switch 134 is connected to one side of the power source by a conductor 135. The other side of the switch 134 by a conductor 136 is connected to the door latching solenoid coil 137, the other side of said coin being connected by a conductor 138 to the other side of the power source 133.

Figure 12:
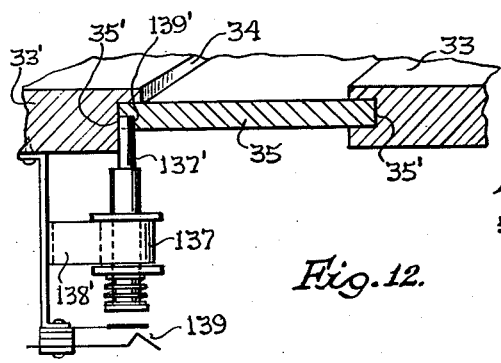
Fig. 12 is a fragmentary sectional detail view taken substantially on line 12—12 of Fig. 7.

This solenoid coil 137 is carried by a bracket 138' from the top wall 33'. The plunger 137' of the coil 137 engages in a socket 139' formed in the door 35 (Fig. 12).

The arrangement is such that upon closing of the switch 134 by deposit of a proper coin through the coin slot 30, the coil 137 will be energized, moving the solenoid plunger 137' from latched engagement with the door 35 to permit the door 35 to be opened to expose the web of paper within the window 34. When the solenoid plunger 137' is moved to door opening position, it closes a switch 139, which through conductors 140 connects the coil 137 with the power source 133 to maintain the energization of the coil 137 until such time as the door is closed by the individual to be photographed. The motor 124 cannot be energized for photographing purposes until the door is closed. Switch 139 is carried by the bracket 138' (Fig. 12).

When the door is closed, the cam 141' carried thereby (Fig. 18) closes switch 141, one side of which by conductor 142 is connected to one side of the normally closed switch 126; the other side of this switch is connected by a conductor 143 to a holding coil 144 which when energized maintains a switch 145 closed. One side of this switch 145 by a conductor 146 is connected to one side of a self-locking holding switch 146' having one side connected to one side of a push button switch 147. The other side of the switch 147 by a conductor 148 is connected to one side of the power source 133. The holding switch 146' is closed by energization of the coil 137 and is opened by the motor 124 at the completion of the cycle of its revolution. Such arrangement will prevent energization of the motor circuit by the closing of the push button switch 147 until the switch 146' is closed by energization of the coil 137. The motor 124 by a conductor 150, in which there is interposed a normally open switch 151, is connected through switch 141 and conductor 141' to one side of power source 133. The other side of the motor 124 through conductor 152 is connected to one side of the switch 145.

The arrangement is such that after door 35 is closed (which closes switch 141) and push button switch 147 is closed, coil 144 will be energized to close switches 145 and 151. This completes a circuit from the power source to the motor, and disc 117 is thereby rotated. At the completion of one cycle of revolution, switch 126 will be opened momentarily to deenergize coil 144 and thus open switches 145 and 151 to deenergize the motor 124. By this arrangement, the photographing operation cannot take place until the door 35 has been closed, closing of which door closes switch 141 whereby the circuit to the motor 124 can be completed by the push button switch 147.

After photographs have been taken of a number of individuals, the exposed undeveloped film reel is removed from the housing 82 and taken to the photographic laboratory where it is developed. Closely adjacent to each developed picture will be likewise developed the identification data. The picture may be mailed to the individual or held until called for by such individual.

Coin-controlled apparatuses have been in operation in public places before the advent of my invention, but in such photographing apparatuses there have been embodied expensive developing mechanism. The developing of the film by such mechanism consumes considerable time, and the developed films have been delivered automatically by the machine to the individual in a generally moist condition and have not been of a very good or acceptable degree of developed quality. By the use of my photographing apparatus, the film is brought to a photographic laboratory where by experienced hands, it is developed in a high degree of perfection.

My photographic apparatus will be highly useful not only for taking pictures of individual members of the public in public places, but also in connection with manufacturing concerns where it is desirable that not only employees' pictures be taken and recorded, but also that pictures of visitors be taken and identified.

The pictures taken by my apparatus may be in black and white or color. The simplicity of construction of my device will be appreciated from the foregoing description. I have found by actual experience that it provides a picture far superior in quality and perfection to those produced by photographing apparatuses in which the development is done automatically immediately following the taking of the picture.

While I have illustrated and described the preferred form of construction for carrying my invention into effect, this is capable of variation and modification without departing from the spirit of the invention. I, therefore, no not wish to be limited to the precise details of construction set forth, but desire to avail myself of such variations and modifications as come within the scope of the appended claims.

Having thus described my invention, what I claim as new and desire to protect by Letters Patent is:

1. A photographic apparatus for recording on a sensitized film a subject and an identification of the subject, comprising a camera having parallel lenses arranged in superimposed relation with respect to each other in the direction of movement of the film, means for moving a paper web within the focus of one of said lenses and on which is written an identification of the subject and for simultaneously moving the film a predetermined distance through the camera, means providing a writing platform for said web within convenient reach of the subject being photographed, for the writting of the identification of the subject on said web prior to its movement in said focus, said web comprising two intimate layers having transfer means therebetween, and means for separating said layers prior to movement of said web to said focus.

2. A photographic apparatus for recording on a sensitized film a subject and an identification of the subject, comprising a camera having parallel lenses in the direction of movement of the film, means for moving a paper web within the focus of one of said lenses and on which is written an identification of the subject and for simultaneously moving the film a predetermined distance through the camera, means providing a writing platform for said web within convenient reach of the subject being photographed, for the writing of the identification of the subject on said web prior to movement in said focus, said web comprising two intimate layers having transfer means therebetween, and means for separating said layers prior to movement of said web to said focus.

3. A photographic apparatus for photographically recording on a sensitized film a subject and an identification of the subject, a camera having parallel lenses arranged in superimposed relation with respect to each other in the direction of the movement of the film, a writing platform having an opening therein, means for moving a paper web through said platform beneath the opening, said web comprising two intimate layers having transfer means therebetween, means for separating said layers when said web is moved to position one of said layers in the range of one of said lenses, a normally latched door for said opening, and coin-controlled means for releasable latching said door in closed position.

4. A photographic apparatus for photographically recording on a sensitized film a subject and an identification of the subject, a camera having parallel lenses arranged in superimposed relation with respect to each other in the direction of the movement of the film, a writing platform having an opening therein, means for simultaneously moving said film relative to the lens and for moving a paper web through said platform beneath the opening, said web comprising two intimate layers having transfer means therebetween, means for separating said layers when said web is moved to position one of said layers in the range of one of said lenses, a normally latched door for said opening, and coin-controlled means for releasably latching said door in closed position.

5. A photographic apparatus comprising a cabinet having a booth to accommodate a subject to be photographed, a camera within said cabinet having a pair of lenses, one of said lenses being focused upon said subject, a writing platform within said booth and having an opening therein, a closure for said opening, coin-controlled means for normally holding said closure in closed position with respect to said opening, means for moving a web of paper beneath said opening to a position in focus with the other lens of the camera, means operated by said moving means for moving a film within the camera, said web comprising two intimate layers having transfer means therebetween, and means for separating said layers prior to movement of said web to said focus.

6. A photographic apparatus comprising a cabinet having a booth to accommodate a subject to be photographed, a camera within said cabinet having a pair of lenses, one of said lenses being focused upon said subject, a writing platform within said booth and having an opening therein, a closure for said opening, coin-controlled means for normally holding said closure in closed position with respect to said opening, means for moving a web of paper beneath said opening to a position in focus with the other lens of the camera, means operated by said moving means for moving a film within the camera, said web comprising two intimate layers having transfer means therebetween, means for separating said layers prior to movement of said web to said focus, and electrically operated means for said camera controlled by said coin-controlled means.

References Cited in the file of this patent
UNITED STATES PATENTS

| | | |
|---|---|---|
| 2,699,100 | Simjian | Jan. 11, 1955 |
| 2,721,497 | Warren | Oct. 25, 1955 |